US010151497B2

(12) United States Patent
Swindon et al.

(10) Patent No.: US 10,151,497 B2
(45) Date of Patent: Dec. 11, 2018

(54) METHOD OF PRODUCING A MICRO-CORE HEAT EXCHANGER FOR A COMPACT INDIRECT EVAPORATIVE COOLER

(71) Applicant: Seeley International Pty Ltd, Lonsdale, South Australia (AU)

(72) Inventors: David Mark Swindon, Lonsdale (AU); Nan Chen, Lonsdale (AU); Shaun Mahoney, Lonsdale (AU); Robert William Gilbert, Lonsdale (AU)

(73) Assignee: Seeley International Pty Ltd, Lonsdale (AU)

( * ) Notice: Subject to any disclaimer, the term of this patent is extended or adjusted under 35 U.S.C. 154(b) by 0 days.

(21) Appl. No.: 15/552,549

(22) PCT Filed: Feb. 23, 2016

(86) PCT No.: PCT/AU2016/050119
§ 371 (c)(1),
(2) Date: Aug. 22, 2017

(87) PCT Pub. No.: WO2016/134417
PCT Pub. Date: Sep. 1, 2016

(65) Prior Publication Data
US 2018/0051896 A1    Feb. 22, 2018

Related U.S. Application Data

(60) Provisional application No. 62/119,718, filed on Feb. 23, 2015.

(51) Int. Cl.
*F28D 9/00*   (2006.01)
*F24F 1/00*   (2011.01)
(Continued)

(52) U.S. Cl.
CPC .......... *F24F 1/0059* (2013.01); *F28D 9/0025* (2013.01); *F28F 13/187* (2013.01);
(Continued)

(58) Field of Classification Search
CPC .... F24F 1/0059; F24F 2001/0085–2001/0092; F28D 9/0025;
(Continued)

(56) References Cited

U.S. PATENT DOCUMENTS 6,216,774 B1 *  4/2001  Tsunoda ............... F28D 9/0018
                                                              165/165
2008/0085437 A1  4/2008  Dean et al.
(Continued)

FOREIGN PATENT DOCUMENTS

EP            1134536 A2 *  9/2001  ........... F28D 9/0025

OTHER PUBLICATIONS

International Search Report and Written Opinion dated Jun. 7, 2016, for corresponding International Application No. PCT/AU2016/050119; International Filing Date: Feb. 23, 2016 consisting of 7-pages.

*Primary Examiner* — Jun S Yoo
(74) *Attorney, Agent, or Firm* — Christopher & Weisberg, P.A.

(57) ABSTRACT

An indirect evaporative cooler core is manufactured from a continuous sheet of hydrophobic material. Flocking is provided on at least a partial surface area of at least one side of the sheet, to render the flocked surface area wettable. Air flow guiding structures are formed upon at least one of the first side and the second side of the sheet. Fold lines are defined in the sheet defining plates extending between adjacent fold lines. Slits are formed along the fold lines. Accordion pleating the sheet at the fold lines forms alternating wet and dry passages between the plates, the wet
(Continued)

passages formed between opposing wettable surfaces, the dry passages formed between non-flocked surfaces, and the accordion pleating causes the slits in the folds to open and form air inlets and outlets in communication with the air flow passages.

18 Claims, 9 Drawing Sheets

(51) Int. Cl.
    *F28F 13/18*     (2006.01)
    *F28F 21/06*     (2006.01)

(52) U.S. Cl.
    CPC .... *F28F 21/066* (2013.01); *F24F 2001/0092* (2013.01); *F28F 2245/02* (2013.01); *F28F 2245/04* (2013.01); *Y02B 30/545* (2013.01)

(58) Field of Classification Search
    CPC .. F28D 1/0471; F28D 1/0535–1/05391; F28D 1/05316–1/05341; F28D 1/0358; F28D 1/0391; F28D 1/053; F28D 1/047; F28D 9/0081; F28D 9/00; F28D 2021/0038; F28F 21/066; F28F 13/187; F28F 2245/04; F28F 2245/02; F28F 17/005; F28F 21/06; F28F 21/061; F28F 21/065; F28F 21/067; F28F 21/068; F28F 2250/04; F28F 2250/104; F28F 2255/00; F28F 2255/06; Y02B 30/545; F25B 39/00–39/028; Y10T 29/4935; Y10T 29/49826
See application file for complete search history.

(56) References Cited

U.S. PATENT DOCUMENTS

2011/0209858 A1     9/2011    Konno
2018/0195744 A1*   7/2018    Choi ...................... F24F 13/30

* cited by examiner

METHOD OF PRODUCING A MICRO-CORE HEAT EXCHANGER FOR A COMPACT INDIRECT EVAPORATIVE COOLER

CROSS-REFERENCE TO RELATED APPLICATIONS

This Application is a Submission under 35 U.S.C. § 371 for U.S. National Stage Patent Application of International Application Number PCT/AU2016/050119, filed Feb. 23, 2016, entitled METHOD OF PRODUCING A MICRO-CORE HEAT EXCHANGER FOR A COMPACT INDIRECT EVAPORATIVE COOLER, which claims priority to U.S. Provisional Application No. 62/119,718, filed Feb. 23, 2015, the entirety of both of which is incorporated herein by reference.

TECHNICAL FIELD

The invention relates to an indirect evaporative cooler, and in particular, an indirect evaporative cooler with a compact core as disclosed for example in International Patent Application No. PCT/AU2015/050528 filed 8 Sep. 2015 (formerly U.S. Provisional Application No. 62/047,160 filed Sep. 8, 2014), entitled "COMPACT INDIRECT EVAPORATIVE COOLER", and assigned to the present assignee, the disclosure of each of which is incorporated herein by reference. The compact core can also be used in a heat recovery heat exchanger.

BACKGROUND OF THE INVENTION

At its core, a modern evaporative cooler typically comprises a stack of thin parallel spaced-apart plates. The plates define alternating wet and dry air-flow passages. In the wet passages a "working" airstream passes over wetted surfaces, accepting and carrying away sensible heat as well as latent heat of evaporation, leaving evaporatively cooled wet surfaces. In the dry passages an initially warm airstream is cooled as heat is transferred by convective transfer from the airstream to the cooled plate surfaces and by conductive heat transfer through the plates. The temperature gradient between the airstreams on either side of the thin plates drives the flow of heat from dry passage side to wet passage side.

U.S. Pat. No. 8,636,269 teaches an evaporative heat exchanger formed of corrugated sheets of material, each sheet having one wettable surface and an opposed dry vapour-resistant surface. Sheets are stacked with wettable surfaces facing each other to form wet passages and dry surfaces facing each other to form dry passages between the sheets. Within the passages, air flow in the center of the passages tends to flows fastest, while air nearest the sheet surfaces flows slowest. Air is an insulator, so the layer of slow moving air directly adjacent the plates constitutes an obstruction to heat transfer. To overcome this barrier, turbulence is introduced into the flow. In accordance with the invention, the general direction of air flow is at an angle to the corrugations, and heat exchange between the wet and dry passages and evaporation within the wet passages can readily take place due to the intensity of mixing promoted by the diagonal flow across the corrugated construction. However, as turbulence increases, so does resistance to flow.

The present inventors developed a more compact, two-stage evaporative cooler as disclosed in PCT/AU2015/050528, assigned to the present assignee. The inventors discovered that when the spacing between the plates is greatly reduced and care is taken to ensure laminar flow rather than turbulent flow, good evaporative cooling and good heat exchange occurs, allowing the length of the passages to be reduced. And although thin passages have a greater resistance to flow (greater pressure drop per distance), as the passage length is reduced the pressure drop becomes manageable.

That is, by pushing air at high shear rates through passages having narrower spacing between plates—and shorter passages—the evaporative cooling system becomes not only compact in size, it also becomes efficient. The smaller cores made possible by this new concept are referred to herein as "micro-cores".

However, as the sheet spacing becomes thinner, a problem arises in manufacturing. Small micro-cores must be connected to large air inlets and outlets. It becomes increasingly problematic to connect, in a commercial scale manufacturing process, the inlet and outlet manifolds to the smaller and smaller wet and dry flow passages.

Further, the conventional manufacturing method involves producing individual plates, stacking the individual plates, aligning the functional structures of the plates, and somehow bonding or fixing the plates to each other. This is time and labour intensive.

A manufacturing method is needed to economically and reliably manufacture "micro-core" heat exchanger or other compact heat exchanger cores on a commercial scale, and in particular using commercially available materials and manufacturing techniques.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect the present invention provides a method for forming a core of a heat exchanger, comprising the following steps in any order:
  providing a roll of a hydrophobic material having first and second sides,
  providing a flock material on at least a partial surface area of at least one side of the hydrophobic material to render the flocked surface area wettable,
  embossing the hydrophobic material to form air flow guiding structures therein,
  defining fold lines in said hydrophobic material,
  forming slits along the fold lines,
  accordion pleating the hydrophobic material to form alternating wet and dry passages, the wet passages formed between opposing wettable surfaces, the dry passages formed between non-flocked surfaces, whereby folding causes the slits in the folds to open and form air inlets and outlets in communication with the air flow passages, and sealing the edges formed by said first and second sides of said hydrophobic material.

According to a second aspect the present invention provides a method for forming plates for a core of a heat exchanger, the method comprising:

providing a sheet of material having a first side and a second side;

providing flocking on at least a partial surface area of at least one side of the sheet, to render the flocked surface area wettable;

forming air flow guiding structures upon at least one of the first side and the second side of the sheet, defining fold lines in the sheet and thereby defining plates extending between adjacent fold lines, and forming slits along the fold lines, whereby accordion pleating the sheet at the fold lines forms alternating wet and dry passages between the plates, the wet passages formed between opposing wettable surfaces, the dry passages formed between non-flocked surfaces, and whereby the accordion pleating causes the slits in the folds to open and form air inlets and outlets in communication with the air flow passages.

According to a third aspect the present invention provides a set of plates for a core of a heat exchanger, each plate comprising:

a sheet of material having a first side and a second side;

flocking on at least a partial surface area of at least one side of the sheet to render the flocked surface area wettable; and airflow guiding structures formed upon at least one of the first side and the second side of the sheet;

the set of plates further comprising fold lines defined between each adjacent pair of plates, and wherein slits are provided along the fold lines, whereby accordion pleating the set of plates forms a core comprising alternating wet and dry passages, the wet passages formed between opposing wettable surfaces, the dry passages formed between non-flocked surfaces, and whereby the slits when folded are open and form air inlets and outlets in communication with the air flow passages.

According to a fourth aspect the present invention provides a non-transitory computer readable medium for forming a core of a heat exchanger, comprising instructions making up a digital blueprint file which, when executed by one or more processors, causes performance of the following:

three-dimensional printing of a set of plates, each plate comprising:

a sheet of material having a first side and a second side;

flocking on at least a partial surface area of at least one side of the sheet to render the flocked surface area wettable; and airflow guiding structures formed upon at least one of the first side and the second side of the sheet;

the set of plates further comprising fold lines defined between each adjacent pair of plates, and wherein slits are provided along the fold lines, whereby accordion pleating the set of plates forms a core comprising alternating wet and dry passages, the wet passages formed between opposing wettable surfaces, the dry passages formed between non-flocked surfaces, and whereby the slits when folded are open and form air inlets and outlets in communication with the air flow passages.

In some embodiments of the invention, only one side of said sheet is flocked.

In some embodiments of the invention, the air flow channels extend generally perpendicularly to the fold lines. The air flow channels in some embodiments are configured so that, once the sheet is accordion pleated to form the core, the channels having unflocked surfaces deliver air from inlets defined by a first subset of said slits positioned at a first side of the core, to outlets defined by a second subset of said slits and positioned at a second side of the core opposite the first side. Moreover, in such embodiments the channels having flocked surfaces are preferably configured to deliver air from return inlets defined by a third subset of said slits positioned at the second side of the core and receiving a portion of the air output from the second subset of slits, to a return outlet defined by a fourth subset of slits positioned at the first side of the core.

In some embodiments of the invention the hydrophobic material is additionally partially crimped or scored along the fold lines to facilitate folding of the material along the fold lines.

In contrast to the prior art methods of manufacture, in which individual plates are formed, aligned, and fixed to each other, herein a method of manufacture is disclosed wherein a continuous sheet of material, which may be any suitable material, including metal and plastic, for example, PVC from a continuous roll, is embossed to form air flow guiding structures. Slits are preferably formed along fold lines. The material of the fold lines between the slits forms a living hinge, which may be partially crimped or scored, so that the sheets may be easily accordion pleated.

The embossing imprints two designs, which alternate from one plate to the next. Folding results in the alternating embossed designs being superimposed, with the alternating designs cooperating to form air passages with respective air inlets, a heat exchange zone, and air outlets between successive sheets. That is, a first and second sheet form at least a first air inlet, heat exchange zone, and air outlet between them. The second sheet cooperates with a third sheet to form at least a first air inlet, a heat exchange zone, and an air outlet between them. The third sheet cooperates with a fourth sheet to form at least a first air inlet, a heat exchange zone, and an air outlet between them. Of course, each embossed design preferably forms at least 10, preferably at least 20, most preferably at least 30 air flow passages. This folding and forming of air passages continues until a desired number of pleats has been formed and a desired net core airflow has been met by the sum of the air throughput of the individual passages.

The sheet of material is preferably flocked at least partially over at least one side of the sheet. When accordion pleated, two flocked surfaces face each other, and two non-flocked surfaces face each other. The flocking material serves to promote water movement by capillary action and water evaporation by increased surface area. A flocked surface will hereafter be referred to as the "wet passage surface". A non-flocked surface, at least in the regions which will form the dry passages in the heat exchange zones, will hereafter be referred to as the "dry passage surface". Accordingly, after folding, a wet passage surface faces a wet passage surface and a dry passage surface faces a dry passage surface.

The embossing serves to imprint a design which will ensure not only the desired spacing of the accordion pleated material, but also mechanical durability and structural rigidity of the pleated material. Preferably the embossing forms raised structures such as channel walls or nodes which are oriented not only parallel to the direction of flow as in the heat exchange zone, but also diagonal to the direction of flow, for example in the air inlet and outlet zone, thus imparting rigidity. The embossing preferably further forms lugs and receptacles upon at least some of the plates in order that, when the accordion pleating brings adjacent plate surfaces together, a lug of one plate is captured in a corresponding receptacle of another plate, for example in a snap-fit or friction fit capture upon application of a suitable force. Once captured, the lugs and receptacles serve to secure the accordion pleating in the desired fully folded configuration and to fix the core in working position.

The sheet is preferably of a material with the elastic and yield properties such that the bending or folding step causes the slits to open to form air inlet and outlet openings. Suitable embossed or formed structures immediately adjacent the slits may in some embodiments be provided in order to encourage the slits to open when the sheet is folded.

The benefits of commercial importance achieved by the method according to some embodiments of the present invention include:

Precise heat exchanger plate alignment is automatically achieved as plates are never separated from each other in the production process.

Precise heat exchanger plate spacing is automatically achieved via this process providing for excellent consistency of performance.

The folding method allows adoption of pleating technology to stack heat exchanger plates in excellent alignment with 50% of sealing points guaranteed by folded plate material.

Folding method ensures that critical sealing points are achieved at the folds.

Seals required in locations other than at the fold points are subject to air flows that enable simple sealing with a roll on sealant.

Use of pleating technology allows stack height of heat exchange core to be simply selected by stacking of the required number of plates.

The production method is easily adaptable to a variety of polymeric materials. Currently flocked PVC but can be combinations of many polymeric materials that provide an impermeable barrier material on one side and a suitable water retaining and distributing material on the other side.

The length and width of heat exchanger pleats can be easily changed. Embossing rolls need to be changed but all other components of the process are simple machine setting changes.

Precise location of pleated heat exchanger permits immediate automated application of end plates, manifold, water tank and sump.

The invention has applications not only for, e.g., indirect evaporative coolers, but is also useful for gas-to-gas (e.g. air-to-air) heat exchangers (heat scavengers, heat recovery systems) and/or liquid-to-gas (e.g. water-to-air) heat exchangers and/or liquid-to-liquid heat exchangers.

The heat exchanger may be an indirect evaporative cooler or a direct evaporative cooler. In the case of a direct evaporative cooler the flocking may be provided on both surfaces of each plate to thereby form the desired direct evaporative structure.

The embossing may be effected by etching, carving, moulding, thermoforming, plastic vacuum forming, or any other suitable means of creating desired airflow channels defined by the embossed surfaces of the plates of the core.

BRIEF DESCRIPTION OF THE DRAWINGS

An example of the invention will now be described with reference to the accompanying drawings, in which.

DESCRIPTION OF THE PREFERRED EMBODIMENTS

Flocking is the process of depositing many small fiber particles (called flock) onto a surface. Flocking is defined as the application of fine particles to adhesive coated surfaces. In a flocking machine the "flock" is given a high-voltage negative charge while the horizontal substrate is grounded. Flock material flies vertically onto the substrate attaching to previously applied glue.

Pleating of materials in industrial scale manufacturing processes is well known, and examples of pleated materials include air filters and oil filters.

Embossing is also well known. EP 0 055 711 B1 entitled "Low Profile Heat Exchanger and Method of Making the Same" teaches forming a heat exchange core for a heater comprising pleating a unitary, elongated strip of heat conducting material to form a plurality of walls defining a fluid passages therebetween. However, air flows parallel to the folds, not transverse to the folds. U.S. Pat. No. 6,892,795 entitled "Embossed Regenerator Matrix for Heat Exchanger" teaches a regenerator matrix for effecting the transfer of heat between two counter-flowing air streams separated in part by face seals. The matrix includes strips of material wound about an axis so as to provide a plurality of layers. The matrix also includes embossments located on at least some of the layers and providing interlayer spaces between at least some of the layers, such that the interlayer spaces extend through the matrix substantially parallel to the axis. The embossments have a uniform height and include primary and secondary embossments. The primary embossments extend substantially parallel to the axis to divide the interlayer spaces into gas passageways and substantially resist circumferential gas leakage between the gas passageways. The primary embossments are also for aligning with the face seals to prevent circumferential gas leakage between the two counter-flowing air streams, and are successively spaced so that at most two successive primary embossments will align with the face seals. The secondary embossments maintain the interlayer spaces at a substantially uniform spacing between the primary embossments, yet allow circumferential gas flow within the gas passageways. There is however no disclosure of accordion pleating. See also the general teaching relating to commercial scale embossing in U.S. Pat. No. 1,571,594; U.S. Pat. No. 2,876,555; U.S. Pat. No. 4,921,643; and U.S. Pat. No. 7,981,184.

The hydrophobic material used in the present invention is preferably susceptible to thermal embossing or thermorforming.

The inventive method may include a step of flocking of select areas of one or both sides of the sheet of material. For example, strips of adhesive may be applied parallel to the direction of folding, transverse to the direction of unrolling of the sheet of material. The strips may be arranged such that, e.g., 5-20 strips of adhesive are applied on each flat surface (i.e., both sides of the material), each strip of adhesive alternating with a strip without adhesive, such that after flocking and folding, flocked areas face each other and non-flocked areas face each other. The longitudinal edges of each flocked strip are provided with a bead of adhesive to serve as a spacer and as a barrier for air flow between wet and dry passages.

Alternatively, adhesive may be applied, and flocking carried out, only in the heat exchange zones, not the air inlet and outlet zones.

Of course, for commercial purposes, it is preferred to obtain sheets of material which are already flocked on one side, such as a commercially available 0.18 mm rigid PVC film, flocked with rayon flock material 1.5 deiner×0.5 mm long fibers on acrylic adhesive.

If however, a custom flocking is desired, embossing may occur either before or after the step of flocking. If the sheets are to be flocked and then stored prior to being finish processed into micro-core heat exchangers, the sheets are preferably left planar and are embossed later at the time of finish processing. If the embossing directly follows flocking, it is preferred to allow time for the flocking adhesive to completely dry. Alternatively, flocking may follow embossing.

The sheet material must be capable of maintaining structural integrity and separating dry air passages and wet air passages. The material is thin enough to allow easy heat transfer across the sheet and thus to readily allow heat to transfer from the dry passage to the wet passage. The sheet is preferably formed of a plastic film such as a thin-wall dense film or sheet of polyethylene, polypropylene, polystyrene, polyvinyl chloride, polyethylene terephthalate, or the like material having good vapor barrier properties. Although a low permeability material such as plastic does not readily transfer heat, heat transfer perpendicularly through the plastic layer will be good since the sheet material according to the present invention is very thin.

The flocking material is used to render one surface of the hydrophobic polymer of the sheet material substantially hydrophilic.

The hydrophilic side of the plate may be provided with an additional liquid retaining layer formed from a fibrous non-woven material. Although reference may be made to a liquid retaining surface, it is clearly understood that the surface is in fact a liquid retaining and releasing surface. The evaporation rate off of a hydrophobic woven or spun bond material where water has been impregnated in between the fibers is higher than from a hydrophilic material where water has been absorbed into the material and between the fibers. This means that a much smaller temperature difference across the plate is required to achieve the same evaporation rate, which therefore increases the heat transfer rate. See for example WO 2010/011687 (Gillan) teaching a hydrophobic fiber sheet formed to wick evaporative fluid.

In the present invention the wicking material or wicking layer/treatment is relatively thin, and thus contains only a small amount of water. Accordingly, the system is efficient in that air rather than water is cooled.

The flocking material is preferably a wicking material and may be hydrophilic or hydrophobic, and suitable materials include cellulose, fiberglass, organic fibers, organic-based fibers, porous plastics, carbon-based fibers, polyesters, polypropylene, silicon-based fibers and combinations of these substances. The wick layer material may be in a number of forms: films, weaves, braids, fibers, beds of particles such as beads and combinations thereof.

A substantially compliant nonwoven wicking material is disposed on and fixedly attached at a number of locations to the hydrophilic surface of the first polymer substrate. Similarly, substantially compliant nonwoven material is also disposed on and fixedly attached at a number of locations to the hydrophilic surface of the second polymer substrate. The substantially compliant nonwoven material can be a spunbonded material, a melt blown material, hydroentangled (spunlaced) material or made through any other processes such as co-forming, airlaying, wetlaying, carding webs, thermal bonding, needle punching, chemically bonding or combinations thereof. Embodiments of spunbonded material include polyolefin, Polyethylene terephthalate (PET) and nylon. Embodiments of melt blown material include polyolefin, Polyethylene terephthalate (PET) and nylon. Embodiments of hydroentangled material include cotton, rayon or viscose staple fiber, lyocell staple fiber, polyolefin staple fiber, polyester staple fiber and nylon staple fiber.

Nonwoven webs can be formed from fibers and filaments based on hydrophobic or hydrophilic polymers. Representative, but not complete, examples of polymers that are hydrophobic for making nonwoven webs are polyolefins and polyethylene terephthalate. Representative, but not complete, examples of hydrophilic polymers for making nonwoven webs include cellulosic materials like cotton, rayon or viscose etc. The application of the fact that under suitable conditions of porosity, fiber/filament diameter, density (GSM) etc, significant capillary action and wicking of water can occur in a web has been innovatively applied in the invention. The invention innovatively utilizes the porosity of certain porous nonwoven webs that can often be sufficient to enable the easy transport of water and other fluids because of wicking caused by capillary action.

Figure 1:
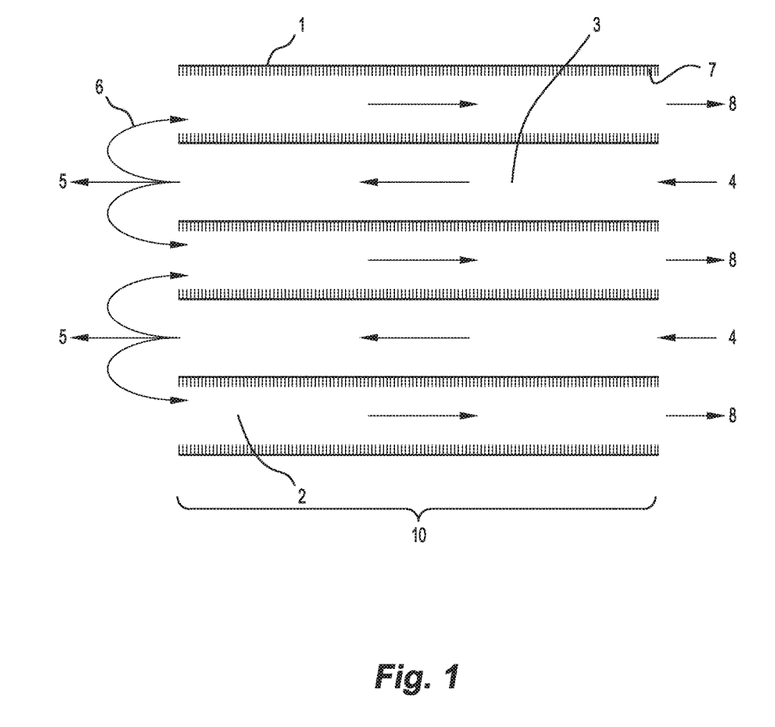
FIG. 1 shows a simplified core comprised of a stack of plates with alternating wet and dry passages, FIG. 2. is a perspective view of a micro-core heat exchanger produced by stacking individual plates in accordance with an embodiment of the present invention.

Turning to the figures, FIG. 1 shows a known airflow configuration for a single core evaporative cooler system comprising parallel heat exchange plates 1. Each plate has a wettable surface on one side and a dry vapor-resistant surface on the opposite side. Plates are stacked with wettable surfaces facing each other to form wet air passages 2 and dry surfaces facing each other to form dry air passages 3 between the plates. Incoming source air 4 to be cooled is directed through the dry passages 3 of heat exchanger 10. Upon exiting the dry passages, the dry cooled air stream is divided approximately evenly into a "supply air" stream 5 for cooling a living space and "return" or "working" air stream 6 which is directed into the wet passages 2. The wet passages have a hydrophilic surface provided with a wicking material 7 which is capable of being kept continuously wet by being intermittently or continuously charged with water. Water evaporates from the wicking surfaces and is carried away by the cool dry air (which has been pre-cooled by the initial passage through the cool dry channel), extracting latent heat, cooling the plates. After passing through the wet passage, the now warmed moisture-laden return air stream 8 is vented to the atmosphere. In turn, since the pre-cooled return air is more effective in lowering the temperature of the hydrophilic surface 7, the incoming air stream 4 in the dry passages is more effectively cooled by contact with the dry-side surfaces of the plates 1. The temperature gradient between the air streams on either side of the thin thermally conductive plate drives the heat flow from dry passage side to wet passage side.

The spacing between the plates is approximately the same whether the plates are defining a wet passage or a dry passage. In the illustrated example, the wicking material extends about one quarter of the way into the wet passages, leaving about 50% of the passage unobstructed. Since the volume of return air is only about 50% of the incoming air, it follows that the effective width of the wet air passage for the return air need only be about 50% of that of the width of the dry air passage for the incoming air.

Computational models and bench tests indicate that when the plate spacing defining the dry or wet passages is reduced to approximately 0.6-2.0 mm, preferably 0.7-1.4 mm, most preferably approximately 0.8-1.2 mm, air can be moved in the passage with laminar flow and high shear rate. With smaller spacing according to the present invention the speed profile is steep, air flow remains laminar, the boundary layer becomes thinner, and hence heat transfer is dramatically increased. It is well known that the longer the passage, the greater the pressure drop between inlet and outlet. Since a smaller passage length is required in the present invention to accomplish the system-effective heat transfer, pressure drop is kept to a minimum. Compared to the prior art heat exchangers relying on turbulent air flow to break up the boundary layer, with turbulent air taking energy and increasing back pressure, the inventive design actually provides efficiencies in heat transfer as well as air flow in both the wet and the dry passages.

In the case of plate spacings greater than 2.0 mm, even if flow is kept laminar, the efficiency of conductive and radiative heat transfer is lost. With spacings narrower than 0.6 mm air flow becomes constricted, pressure drop becomes high, and the benefits of the invention are lost.

The heat exchanger of the present invention, with micro-core with passages as defined herein, can be adapted to virtually any design, and be used in virtually any system, and offer the benefits of reduced bulk. General systems and materials will be described in the following, without the invention being limited to the exemplary materials.

The prior art teaches that hydrophilic materials can better hold water. However, in relation to the cooling apparatus, the application of this quality has a disadvantage that in the case of a nonwoven web made from hydrophilic polymers, some of the water will swell the fibers and the rest will go around and over the fibers. This would lose the rigidity in the heat exchanger pads. Further, in relation to the cooling apparatus, hydrophilic non woven would swell, while one of our objectives is to retain the thinnest film of the water to facilitate better heat transfer and evaporation. Porous low density nonwoven webs made from hydrophobic fibers or filaments can transfer water through wicking action. Water can flow along, around and over but not through the hydrophobic polymer fibers. The porosity and associated wicking action by a porous nonwoven web can render the nonwoven web effectively hydrophilic in terms of its capability to be wet and easily spread water even if the fibers or filaments constituting the nonwoven web are made from hydrophobic polymers. The invention thus innovatively employs the materials known to be hydrophobic for the retention of water as required. The invention overcomes the problem in maintaining rigidity of heat exchanger pads due to the use of hydrophilic material, as evidenced by relevant prior art, by employing hydrophobic material.

Examples of fibers that are hydrophobic are polyolefins and polyethylene terephthalate. Porous low density nonwoven webs made from these hydrophobic fibers or filaments can be hydrophilic through wicking action.

Figure 2:
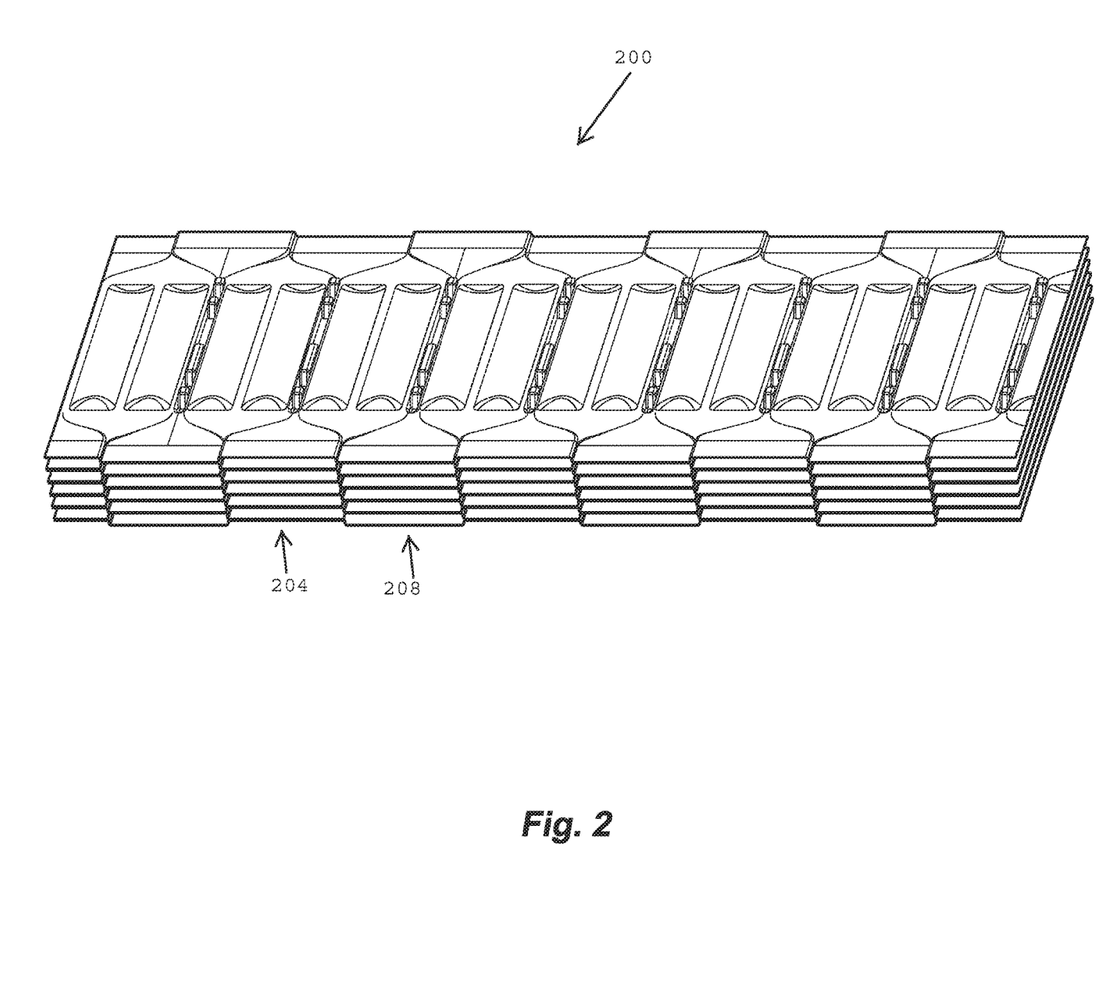

FIG. 2 is a perspective view of a micro-core heat exchanger 200 produced by stacking individual plates in accordance with an embodiment of the present invention, A central tenet of the present invention is accordion pleating formation of the core 200, and the use of slits on the fold lines to provide the air inlets and outlets. The repeating nature of the embossing formed on the plates of the core 200 results in each column of vents forming either a stack of inlet vents 204 serving the same function as inlet 4 in FIG. 1, or a stack of outlet vents 208 serving the same function as the vents 8 in FIG. 1. Such grouping or stacking of vents serving a common purpose is particularly beneficial in easing the task of fitting a manifold to the core 200.

Figure 3:
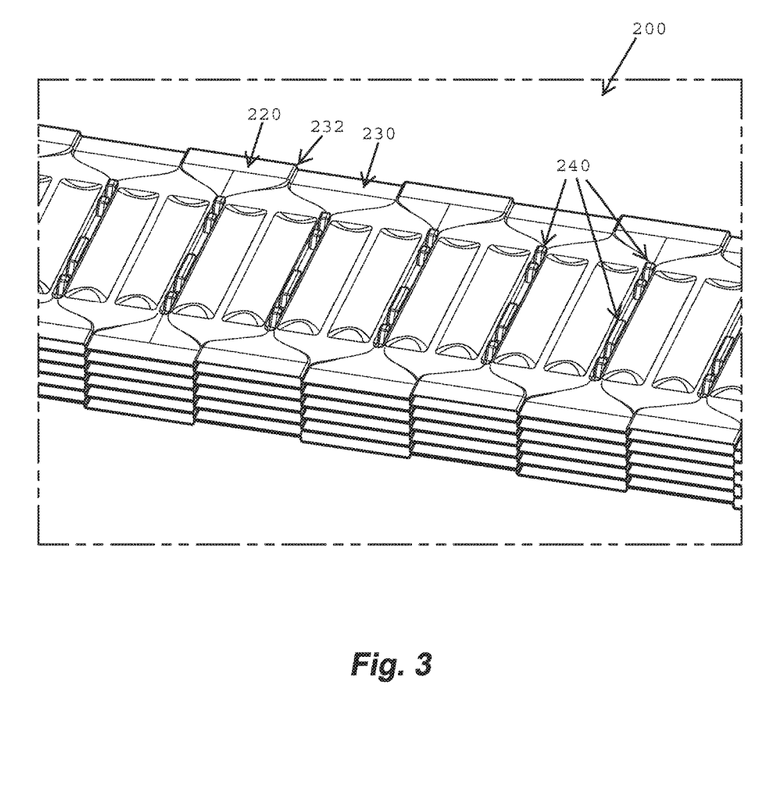
FIG. 3 is an enlarged partial view of the micro-core heat exchanger of FIG. 2.

FIG. 3 is an enlarged partial view of the micro-core heat exchanger 200 of FIG. 2, and illustrates the importance of the embossed channels formed upon each plate in accordance with the invention. In this embodiment, a depression is embossed into the plate in the region 230, and a boss is formed in the region 220, creating a shoulder 232 between these regions. A slit is formed along the fold line adjacent the depressed region 230, but not adjacent the boss 220. As a consequence of the surface structures, folding along the fold line adjacent regions 220 and 230 will cause the slit adjacent region 230 to open into a vent. The repeating pattern of bosses 220 and depressions 230 results in the stacks of vents 204 and 208.

FIG. 3 also illustrate the lugs 240, which on their underside form corresponding receptacles. The lugs and receptacles 240 engage in a friction fit when the core is fully folded and all plates are pressed against the adjacent plate, thus securing the core 200 from unintended unfolding.

Figure 4:
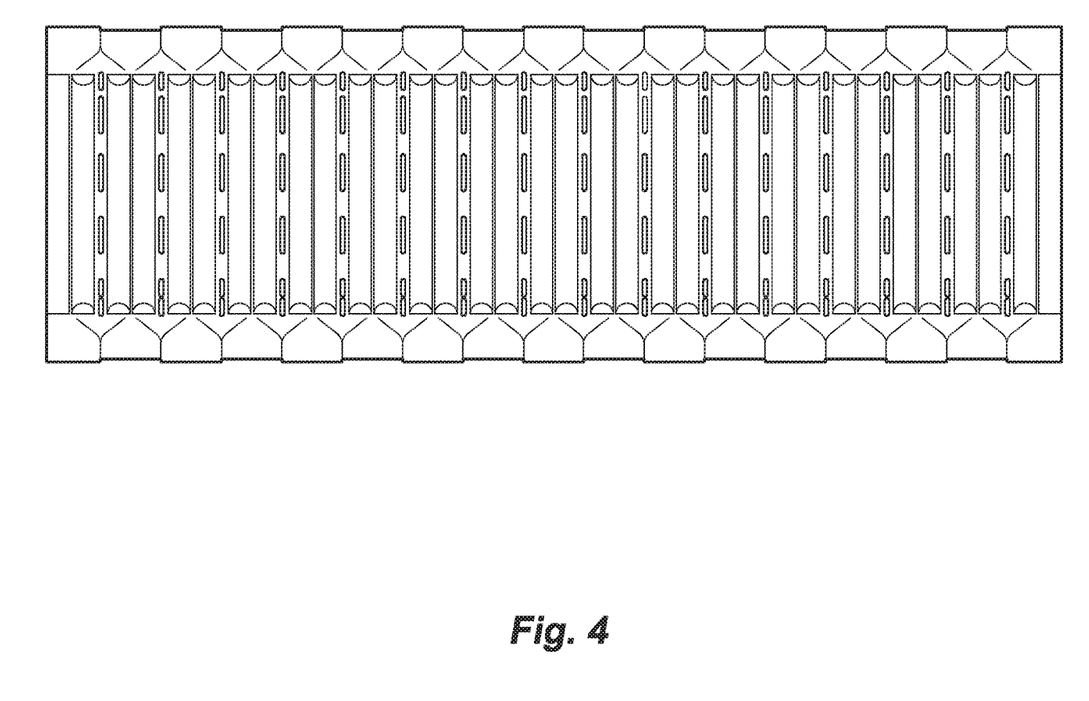
FIG. 4 is a plan view of an embossed sheet of hydrophobic material with slits formed along fold lines in accordance with another embodiment of the present invention.

FIG. 4 is a plan view of an embossed sheet of hydrophobic material with slits formed along fold lines in accordance with another embodiment of the present invention.

Figures 5A, 5B:
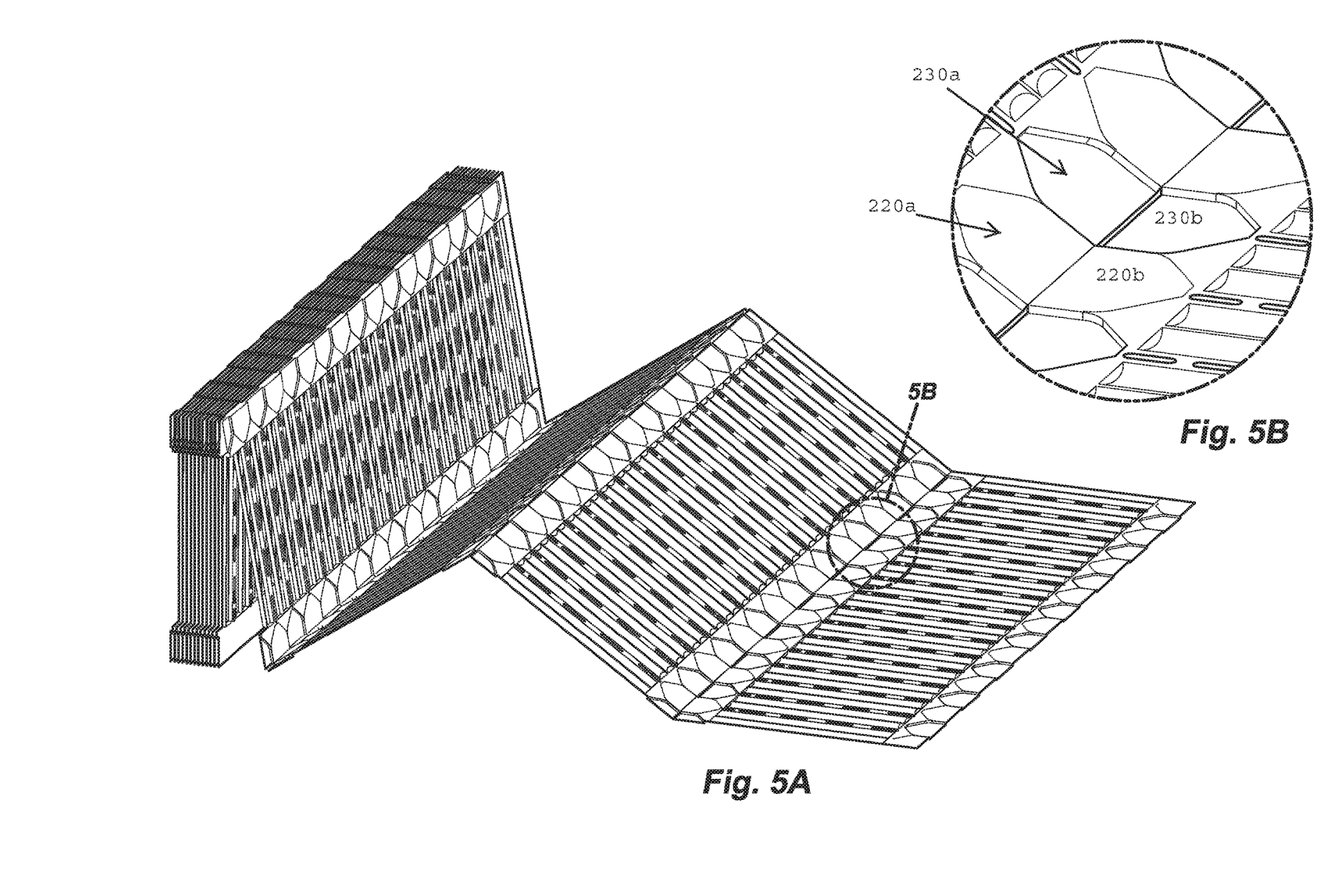
FIGS. 5A and 5B are a perspective view showing forming of the micro-core by pleating (left side) including the formation of air inlets and outlets as the slits open upon folding of the material.

FIGS. 5A and 5B are a perspective view showing forming of the micro-core by gathering flat plates (right side) into an accordion pleating (left side), simultaneously effecting the formation of air inlets and outlets as the slits open upon folding of the material. In particular, referring to FIG. 5B, it can be seen that the folding of the sheet along the respective fold line causes the boss 220*a* of a first plate to fold over onto the boss 220*b* of the adjacent plate. In contrast the depression 230*a* in the first plate is held a distance away from the corresponding depression 230*b* in the adjacent plate, thereby opening the slit between 230*a* and 230*b* into a vent. Moreover, the region 220*a* which serves as a boss on the side of the plate shown will serve as a depression on the other side of the same plate, that depression will in turn create a vent on that side of the plate. Thus, every second vent along an edge of each plate will serve as a vent for the wet passage on one side of the plate, while the other vents along that edge will serve as a vent for the dry passage on the other side of the plate.

Figure 6:
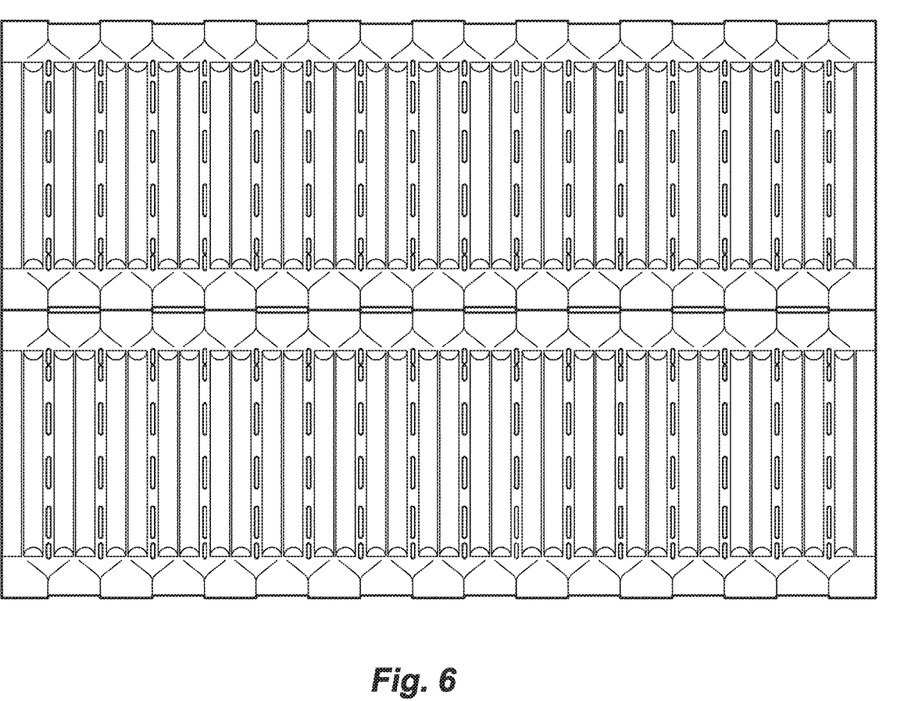
FIG. 6 is a plan view of a portion of the embodiment of FIG. 5, showing how the slits in one fold line form openings for the wet passages and slits in the next fold form openings for the dry passages, FIG. 7 schematically represents an evaporative cooler with micro-core.

FIG. 6 is a plan view of a portion of the embodiment of FIG. 5, showing how the slits in one fold line form openings for the wet passages and slits in the next fold form openings for the dry passages.

Figure 7:
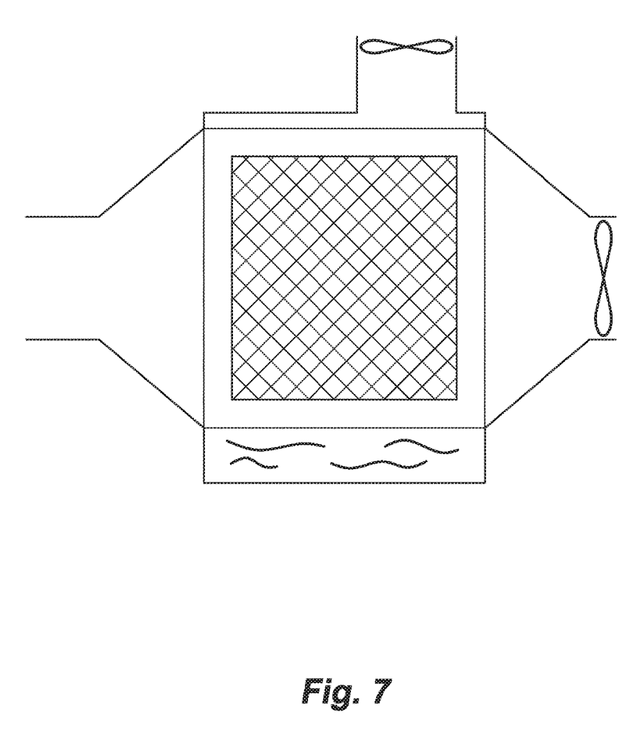

FIG. 7 schematically represents an evaporative cooler with micro-core constructed in accordance with the present invention.

Figure 8:
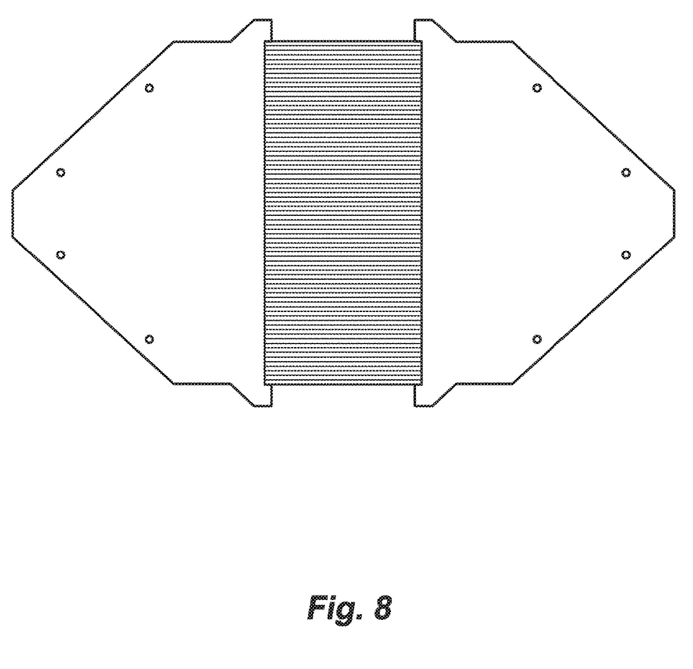
FIG. 8 shows an evaporative cooler structure, using the micro-core according to one embodiment of the invention.

FIG. 8 shows an evaporative cooler structure, using the micro-core according to one embodiment of the invention.

Figure 9:
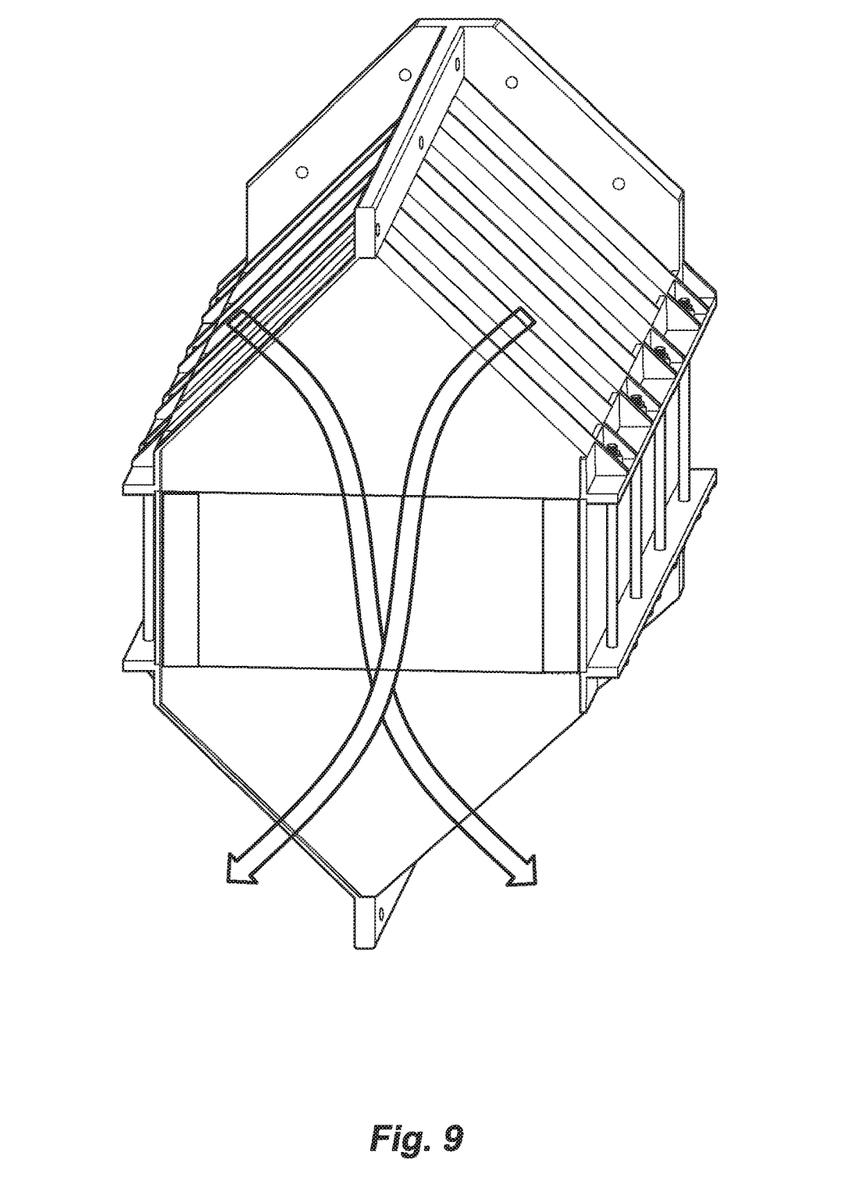
FIG. 9 shows the design of an evaporative cooler.

FIG. 9 shows the design of an evaporative cooler, using the micro-core according to one embodiment of the invention.

Some embodiments of the invention may utilise 3D printing for construction of the device. Accordingly, in some embodiments the present invention may reside in a digital blueprint comprising a digital file in a format configured for use with rapid prototyping and computer aided design (CAD) and/or manufacturing, such as being in the STL (stereolithography) file format. Such digital blueprint files, whether produced by performing a three dimensional scan of an embodiment of the invention, or produced by a CAD development software tool, or the like, are within the scope of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for forming a core of a heat exchanger, comprising the following steps in any order:
    providing a roll of a hydrophobic material having first and second sides;
    providing a flock material on at least a partial surface area of at least one side of the hydrophobic material to render the flocked surface area wettable;
    embossing the hydrophobic material to form air flow guiding structures therein;
    defining fold lines in said the hydrophobic material;
    forming slits along the fold lines;
    accordion pleating the hydrophobic material to form alternating wet and dry passages, the wet passages being formed between opposing wettable surfaces, the dry passages being formed between non-flocked surfaces, whereby folding causes the slits in the folds to open and form air inlets and outlets in communication with the air flow passages; and
    sealing the edges formed by the first and second sides of the hydrophobic material.

2. The method according to claim 1, wherein only one side of the hydrophobic material is flocked.

3. The method according to claim 1, wherein the air flow passages extend generally perpendicular to the fold lines.

4. The method according to claim 1, wherein the hydrophobic material is additionally partially crimped or scored along the fold lines to facilitate folding of the material along the fold lines.

5. A method for forming plates for a core of a heat exchanger, the method comprising:
    providing a sheet of material having a first side and a second side;
    providing flocking on at least a partial surface area of at least one side of the sheet, to render the flocked surface area wettable;
    forming air flow guiding structures upon at least one of the first side and the second side of the sheet;
    defining fold lines in the sheet and thereby defining plates extending between adjacent fold lines; and
    forming slits along the fold lines,
    whereby accordion pleating the sheet at the fold lines forms alternating wet and dry passages between the plates, the wet passages formed between opposing wettable surfaces, the dry passages formed between non-flocked surfaces, and whereby the accordion pleating causes the slits in the folds to open and form air inlets and outlets in communication with the air flow passages.

6. The method according to claim 5, wherein only one side of the sheet is flocked.

7. The method according to claim 5, wherein the air flow passages extend generally perpendicularly to the fold lines.

8. The method of claim 5, wherein the air flow channels are configured so that, once the sheet is accordion pleated to form the core, the channels having unflocked surfaces deliver air from inlets defined by a first subset of said slits positioned at a first side of the core, to outlets defined by a second subset of said slits and positioned at a second side of the core opposite the first side, and wherein the channels having flocked surfaces are configured to deliver air from return inlets defined by a third subset of said slits positioned at the second side of the core and receiving a portion of the air output from the second subset of slits, to a return outlet defined by a fourth subset of slits positioned at the first side of the core.

9. The method according to claim 5, wherein the sheet of material is additionally partially crimped or scored along the fold lines to facilitate folding of the material along the fold lines.

10. The method of claim 5, wherein the sheet of material is PVC.

11. The method of claim 5, wherein the sheet of material is from a continuous roll.

12. The method of claim 5, wherein the formed structures on the sheet further serve to impart mechanical durability and structural rigidity of the pleated material.

13. The method of claim 5, wherein the formed structures on the sheet further comprise lugs and receptacles upon at least some of the plates in order that, when the accordion pleating brings adjacent plate surfaces together, a lug of one plate is captured in a corresponding receptacle of another plate to secure the accordion pleating in fully folded configuration.

14. The method of claim 5, wherein the sheet is of a material with elastic and yield properties such that the folding step causes the slits to open to form air inlet and outlet openings.

15. The method of claim 5, wherein the heat exchanger is an indirect evaporative cooler.

16. The method of claim 5, wherein the heat exchanger is an air-to-air heat exchanger.

17. The method of claim 5, wherein the heat exchanger is a liquid to gas heat exchanger.

18. The method of claim 5, wherein the heat exchanger is a liquid to liquid heat exchanger.

* * * * *